Patented Dec. 1, 1953

2,661,276

UNITED STATES PATENT OFFICE 2,661,276

HERBICIDES

Arthur H. Schlesinger and David T. Mowry, Dayton, Ohio, assignors to Monsanto Chemical Company, St. Louis, Mo., a corporation of Delaware No Drawing. Application January 25, 1951, Serial No. 207,851

2 Claims. (Cl. 71—2.5)

The present invention relates to herbicides and deals more particularly with methods for the general destruction of undesired plants.

A number of herbicides are known, a variety of organic and inorganic compounds having been suggested in the prior art for use as plant-killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil micro-organisms, which results in loss of the active material.

Now we have found that very efficient, stable and non-corrosive herbicidal compositions are obtained by employing as the active ingredient a quinoline compound having both a chloro- and a nitro-substituent in the heterocyclic portion of the molecules. Valuable for the present purpose are quinoline derivatives having the general formula

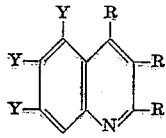

in which R is selected from the class consisting of hydrogen, chlorine and the nitro radical and in which at least one R is chlorine and at least one R is the nitro radical, and Y is selected from the class consisting of hydrogen, chlorine, the nitro radical and alkyl radicals of from 1 to 4 carbon atoms.

One class of compounds having the above general formula are chloronitroquinolines which may be represented as follows:

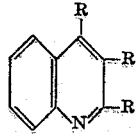

in which R is as defined above. This class includes 3-chloro-4-nitroquinoline, 4-chloro-3-nitroquinoline, 2-chloro-3-nitroquinoline, 3-chloro-2-nitroquinoline, 4-chloro-2-nitroquinoline, 2-nitro-4-chloroquinoline, 2,3 - dichloro-4-nitroquinoline, 4-chloro-2,3-dinitroquinoline, etc.

Another class of compounds contemplated by the invention includes chloronitroquinolines in which there is present also one or more nitro substituents in the 5-, 6- and 7-position. Such compounds have the general formula

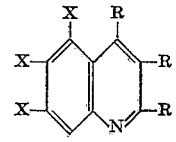

in which R is as defined above and X is selected from the class consisting of hydrogen and the nitro radical and in which at least one X is the nitro radical. This class of compounds includes, for example, 4-chloro-3,6-dinitroquinoline, 3-chloro-4,5,7-trinitroquinoline, 2 - chloro-4,6-dinitroquinoline, etc.

Still another class of compounds included in the invention embraces chloronitroquinolines in which there is present also a chlorine radical in the 5-, 6- and/or 7-position. Such compounds have the general formula

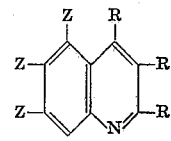

in which R is as defined above and Z is selected from the class consisting of hydrogen and chlorine and in which at least one Z is chlorine. This class of compounds includes for example 3,6-dichloro-4-nitroquinoline, 4,5,6-trichloro-3-nitroquinoline, 2,7-dichloro-3-nitroquinoline, etc.

A further class of compounds which is included in the present invention embraces chloronitroquinolines in which there is also present in 5-, 6- and/or 7-position an alkyl radical of from 1 to 4 carbon atoms. Such compounds have the general formula

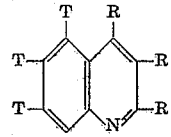

in which R is as herein defined and T is selected from the class consisting of hydrogen and alkyl radicals of from 1 to 4 carbon atoms, and in which at least one T is the alkyl radical. Examples of this class of compounds are 3-chloro-5 - methyl-4-nitroquinoline, 4-chloro-7-ethyl-3-nitroquinoline 2 - chloro - 4 - nitro-3-propylquinoline and 6-butyl-2-chloro-3-nitroquinoline.

Compounds having the above general formula are obtainable from other quinoline derivatives in known manner. Thus, they may be prepared by reacting the appropriate hydroxynitroquinoline compound with phosphorous pentachloride, by nitration of the appropriate chloroquinolines or by reaction of anthranilic acid or its derivatives with methazonic acid.

The present chloronitroquinolines are effective herbicides over wide ranges of concentrations. The effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentrations of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanon and Norman, Botanical Gazette, 107, 476-507 (1946).

The present invention is illustrated, but not limited by the following examples:

Example 1

The herbicidal activity of 4-chloro-3-nitroquinoline was determined by germination of cucumber seeds for 4 days at a temperature of 76° F. in the presence of aqueous suspensions of 100 parts by weight of the compound per million parts of water. Seventy-five seeds were used for each test. The length of the primary roots of the resulting seedlings was only 3% of the primary root length of seedlings which had been germinated in water, in the absence of the chemical. When only 10 parts per million of the 4-chloro-3-nitroquinolines were used in the test, the length of the primary root seedlings was only 7% of those germinated in water in absence of the chemical.

Example 2

The herbicidal activity of 4-chloro-3-nitroquinoline was tested against wheat employing the testing procedure used in Example 1, except that wheat seeds instead of cucumber seeds were used. Employing aqueous suspensions of 100 parts by weight of the compound per 1,000,000 parts of water the length of the primary roots of the resulting wheat seedlings was only 5% of those germinated in water in absence of the chemical. However, when only 10 parts per million of the 4-chloro-3-nitroquinoline were used in the test the length of the primary root seedlings was 68% of those germinated in absence of the chemical. These results show that at the lower concentrations, i. e., at 10 parts per million, 4-chloro-3-nitroquinoline is a selective herbicide inhibiting almost entirely the growth of broad leafed plants as shown in Example 1, but having only little activity against the narrow leafed plants as shown in this example.

Similarly good results may be obtained by employing, instead of 4-chloro-3-nitroquinoline, the isomeric 3-chloro-4-nitroquinoline, 2-chloro-3-nitroquinoline, 3-chloro-2-nitroquinoline, 4-chloro-2-nitroquinoline or 2-chloro-4-nitroquinoline, or mixtures of the same. There may also be advantageously employed derivatives of these chloroquinolines in which there is present at the 5-, 6- and/or 7-positions one or more of the following: Chlorine, the nitro radical and alkyl radicals of from 1 to 4 carbon atoms. Extensive study of the herbicidal activity of quinoline derivatives has shown that such substituents at the designated positions do not detract from the herbicidal effect of the chloroquinolines, and that in some instances, particularly in compounds having a chloro- or nitro-substituent in the 2-position, the presence of one or more of these additional substituents at the 5-, 6- and/or 7-position is advantageous.

The herbicidal efficiency of the present chloroquinolines is remarkable, because as shown in the table given all quinoline derivatives do not generally possess great herbicidal efficiency. When tested as described above, aqueous suspensions of a random group of such compounds were found to have the following effects:

| Compound tested | Percent growth at 100 parts per million |
|---|---|
| 6-chloro-8-nitroquinoline | 55 |
| 8-nitro-6-methoxyquinoline | 68 |
| 7-chloro-4-hydroxyquinoline | 61 |
| 4-hydroxy-3-nitroquinoline | 78 |
| 7-chloro-4-hydroxyquinoline-2-carboxylic acid | 95 |

Herbicidal compositions containing the present quinoline compounds may be oil solution or an oil emulsion of the quinoline compound. The oil solutions may be obtained simply by dissolving the quinoline compound in oil in effective proportions. In most instances, however, it is more expedient to prepare oil concentrates of the quinoline concentrate, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

The present quinoline compounds may be made water-soluble by converting them into their salts in known manner, e. g., their hydrochlorides, sulfates, etc. The salts thus obtained are generally water-soluble compounds which often possess the herbicidal efficiencies of the parent quinoline compounds.

The present chloronitroquinolines are preferably applied by spraying an aqueous suspension of the same, this method affording an easy and inexpensive way of destroying plant growth. However, they are likewise effective when applied in agricultural dusts; or they may be used with water-insoluble insecticides, fungicides, etc. in customarily employed organic solutions.

Herbicidal compositions containing the present compounds may be used to destroy already existing plant growth by direct application to the undesirable plants, or they may be employed to prevent the plant growth, for example in parking areas, highway abutments, railway yards, etc., they may be applied either as an aqueous or oily spray or dust or they may be admixed with customarily employed temporary surfacing materials, e. g., oils, cinders, etc. The present invention thus provides a generally useful method of preventing and destroying undesirable plant growth.

0.1 part to 20 parts of the quinoline derivatives per hundred parts by weight of the carrier may be employed, and in this manner an acre of land may be freed of plants by application of only a few pounds of one of the present herbicides.

What we claim is:
1. A method of destroying undesired plants which comprises applying to said plants a herbicidal composition including 4-chloro-3-nitroquinoline as the active ingredient.
2. A method of destroying undesired plants which comprises applying to said plants an aqueous suspension of 4-chloro-3-nitroquinoline.

ARTHUR H. SCHLESINGER.
DAVID T. MOWRY.

References Cited in the file of this patent

UNITED STATES PATENTS

| Number | Name | Date |
|---|---|---|
| 2,427,677 | Knapp | Sept. 23, 1947 |

FOREIGN PATENTS

| Number | Country | Date |
|---|---|---|
| 474,433 | Great Britain | 1936 |
| 475,569 | Great Britain | 1936 |
| 817,081 | France | May 15, 1937 |
| 654,419 | France | Nov. 28, 1928 |
| 711,663 | France | June 30, 1931 |